United States Patent [19]

Shaw

[11] 4,369,079

[45] Jan. 18, 1983

[54] SOLID NON-AZIDE NITROGEN GAS GENERANT COMPOSITIONS

[75] Inventor: Graham C. Shaw, Garland, Utah

[73] Assignee: Thiokol Corporation, Newtown, Pa.

[21] Appl. No.: 221,942

[22] Filed: Dec. 31, 1980

[51] Int. Cl.$^3$ .............................................. C06B 45/00
[52] U.S. Cl. ....................................... 149/2; 149/45; 149/61; 264/3 C; 280/728
[58] Field of Search ............... 149/2, 45, 61; 264/3 C; 280/728

[56] References Cited

U.S. PATENT DOCUMENTS 3,928,964 12/1975 Hamilton ........................... 362/19.4

*Primary Examiner*—Stephen J. Lechert, Jr.
*Attorney, Agent, or Firm*—Gerald K. White

[57] ABSTRACT

A solid non-azide, non-toxic, substantially moisture-free nitrogen gas generating composition intended for use in the deployment of inflatable safety crash bags for driver and passenger protection in vehicles consists essentially of a metal salt of a non-hydrogen containing tetrazole compound selected from the group consisting of alkali metal salts and alkaline earth metal salts and an oxidizer containing nitrogen and a member selected from the group consisting of an alkali metal and an alkaline earth metal, the tetrazole being an azobitetrazole, and examples of the oxidizer being sodium nitrate, sodium nitrite and potassium nitrate.

13 Claims, No Drawings

4,369,079

SOLID NON-AZIDE NITROGEN GAS GENERANT COMPOSITIONS

BACKGROUND OF THE INVENTION

A. Field of the Invention

This invention relates to non-toxic solid gas generants, particularly those suitable for the production of substantially pure nitrogen gas, and more particularly to the use of high nitrogen content compounds, preferably containing no hydrogen, such as the dialkali salts of bitetrazole or azobitetrazole or the like as a base for such generants

B. Description of the Prior Art

There has been considerable interest in the generation of nitrogen gas for a number of purposes including the inflation of aircraft or automobile safety crash bags, also termed air bags, and the purging of fuel lines and storage tanks for reactive or pyrogallic fuels as used in liquid fueled rocket motors.

The details of crash bag systems have been widely discussed, as have the reasons for the selection of pyrotechnic devices for the rapid and dependable generation of gases for inflating the bag. The operational constraints of crash bags are also well known. The system must supply non-toxic gas to inflate the bag because air bag systems generally vent into the passenger compartment on deflation, and because of the very real probability of bag rupture in an actual crash situation. Additionally, the gas must inflate the bag at a temperature which the vehicle occupant can tolerate. The time period for attainment of maximum inflation has been determined to be from 20 to 100 milliseconds. The device must be safe to handle and store prior to production. It must be adaptable to mass production line installation techniques and not introduce an unreasonable hazard then or during the life of the vehicle. It must assure reliable operation during the life of the vehicle containing it, which may be on the order of 10 years or longer.

The objectives of rapid generation of cool non-toxic inflation gas and long-term operability depend to a large extent on the gas generant selected and the physical form into which it is initially compounded.

If a suitable propellant can be designed, then the design of a complete passive restraint system undertaken with consideration of the characteristics of a particular propellant stands a better chance of practical success.

Naturally, from every point of view, the most desirable atmosphere inside an inflated crash bag would correspond in composition to the air outside it. This has thus far proven impractical of attainment. The next best solution is inflation with a physiologically inert or at least innocuous gas. The most practical of these gases has proven to be nitrogen.

The most successful of the prior art solid gas generants of nitrogen that are capable of sustained combustion have been based upon the decomposition of compounds of alkali metal, alkaline earth metal and aluminum derivatives of hydrazoic acid, especially sodium azide. Such a nitrogen gas generant comprising mixtures of alkali metal azides, metal and metalloid oxides, molybdenum disulfide, and optionally sulfur, pressed into pellets is disclosed in U.S. Pat. No. 4,203,787 that was granted on May 20, 1980 to George F. Kirchoff and Fred E. Schneiter.

There are disadvantages, however, to the use of these azides, particularly in the generation of the inflating gas for air bag systems.

Sodium azide, a Class B explosive, is a highly toxic material. It is easily hydrolyzed, forming hydrazoic acid which is not only a highly toxic and explosive gas, but it also readily reacts with heavy metals such as copper, lead, etc. to form extremely sensitive solids that are subject to unexpected ignition or detonation. Especial handling in the manufacture, storage and eventual disposal is required to safely handle such materials and gas generants prepared from the azide compounds.

A number of other nitrogen gas generants have been reported, as disclosed, for example, in U.S. Pat. Nos. 3,004,959, 3,055,911, 3,171,249, 3,719,604, 3,814,694, 3,873,477 and 3,912,561. Many of the prior art gas generants are based on nitrogen-containing compounds such as those derived from the various hydroxamine acid and hydroxylamine derivatives, while others consist of various polymeric binders, hydrocarbons and carbohydrates which are oxidized to produce non-corrosive and, often termed, "non-toxic" gases. The gas products from these compositions contain unacceptably high levels of $CO_2$, CO and water for use in air bag applications where the possibility exists that the occupant may breathe, even for short periods of time, high concentrations of the gases produced from the gas generator. These compositions do not meet the requirements that the combustion products meet industrial standards for toxic and other gases such as CO, $CO_2$, etc.

SUMMARY OF THE INVENTION

This invention relates to a solid composition capable of sustained combustion to produce an atmosphere of predominately nitrogen and nonvolatile solids as the combustion products. The gas generated is non-toxic, is suitable for use in applications such as the inflatable crash restraint systems for aircraft or automobile crash bags which have stringent requirements limiting the levels of impurities for a gas product which could be inhaled directly by an occupant.

The nitrogen atmosphere generated by the composition is inert and could also be used to purge fuel lines and storage tanks for reactive or pyrogallic fuels as used in liquid fueled rocket motors.

The nitrogen source according to the present invention is based upon high nitrogen content compounds, containing no hydrogen, such as the dialkali salts of bitetrazole or azobitetrazole. A nitrogen containing oxidizer such as an alkali nitrate or nitrite oxidizer is used to free the nitrogen and tie up the carbon in the organic molecule as the alkali carbonate, which is sufficiently thermally stable to withstand the conditions of the oxidation reaction thereby effectively removing the $CO_2$ from the combustion products. This also has the effect of limiting the amount of CO in the gas products.

The use of a composition having a high nitrogen content and containing no hydrogen is especially advantageous in a gas generator for air bags. It is noted, in this connection, that with hydrogen in the composition, water is a product of the combustion and results in a flow of steam into the bag, as little as 3 percent by weight of hydrogen in the composition producing up to 20 percent by volume of steam in the air bag. Condensation of the steam in the air bag causes pre-deflation, that is collapse of the bag too quickly since a reduction in volume of about 1000 to 1 occurs upon condensation of the steam. Additionally, the capacity of the bag, when wet, to transfer heat to its outer surface is increased substantially, thereby creating a situation that may result in severe burns to the vehicle occupant. The possibilities of such predeflation and injuries to the occupant including burning are avoided with the use of the composition containing no hydrogen.

The composition has the additional advantage of being insensitive to accidental ignition by friction or impact. The gas generant composition and its combustion products are not highly toxic materials and therefore do not require specialized handling techniques to minimize toxicity or contamination problems in fabrication, storage, or disposal of generator units embodying the generant. The combustion products of the compositions are primarily nitrogen gas and alkali carbonates such as sodium or potassium carbonate.

A tetrazole, as those skilled in the art understand, comprises a crystalline acid compound, $CH_2N_4$. This compound may be regarded as pyrrole in which nitrogen atoms replace three CH groups; also, any of various derivatives of the same.

The invention also provides a method for the generation of substantially pure and substantially particle free nitrogen gas at pressures below 2000 psia in the gas generator chamber, where generation is initiated at normal room temperature, which comprises:

(a) treating a nitrogen gas generant composition comprising a mixture of 35 to 60 weight percent of a dialkali salt of bitetrazole and 40 to 65 weight percent of an alkali nitrate or nitrite with hot combustion products of an igniter combustion mixture of 5 to 25 weight percent boron and 75 to 90 weight percent potassium nitrate, said hot combustion products being of sufficient quantity to induce and sustain oxidation of said dialkali salt of bitetrazole by said alkali nitrate or nitrite;

(b) passing the products of combustion of said nitrogen gas generant composition through cooling, filtration and pH adjustments means; and (c) using the generated gas to inflate an air bag.

DESCRIPTION OF THE PREFERRED EMBODIMENT

The manner of making and using the nitrogen gas generant compositions of the invention will now be described with reference to a specific embodiment thereof, namely a nitrogen gas generant composition consisting of a potassium salt of bitetrazole ($K_2BT$) arranged to be oxidized with potassium nitrate.

In order to prepare the gas generant composition, the components, the potassium salt of bitetrazole and the potassium nitrate, which are commercially available, may be dry blended as powders by standard methods. The blended powder, may, if desired for use where rapid, controlled, repeatable, and long term reliably accurate performance is intended, be compressed into tablets, granules or pellets by conventional techniques. Since the components of the gas generant composition and the composition itself is not highly toxic, special handling techniques to minimize toxicity or contamination are not required in the fabrication of the composition or in the pelletizing thereof.

One skilled in the art will recognize that one may substitute other dialkali salts of bitetrazole or azobitetrazole for the potassium salt of bitetrazole illustrated herein above such as sodium bitetrazole or azobitetrazole compounds such as aminotetrazole, bistetrazoletetrazine, tetrazole, polyhydrazides, or poly azo-alkyl, and that one may substitute other alkali nitrates or nitrites for the potassium nitrate, such as sodium, lithium, magnesium, strontium and barium nitrate or nitrite as the oxidizer to free the nitrogen and tie up the carbon in the organic molecule as the alkali carbonate.

The particle sizes of the generant composition components are not particularly critical and the commercially available materials sized as powders or small crystals are suitable. When rapid combustion rates are essential, the particle size must be more closely controlled. Submicron size particles may be employed in preparing pelletized gas generant compositions. Particle sizes of 0.7 to $0.9\mu$ are particularly preferred in obtaining embodiments of the invention with burning rates within the desired range.

One skilled in the art will recognize that as the compositions of the instant invention are cooler burning than most other gas generator compositions in general, they require a hot initiator to start the combustion process reliably. Although many equivalent initiators will occur to one skilled in the art, and the use of such equivalents is comprehended in the process of the invention both in the specification and appended claims, a particularly convenient and preferred initiator composition is one consisting of 5 to 25 weight percent, preferably about 10 weight percent boron; 75 to 95 weight percent, preferably about 85 weight percent potassium nitrate to which mixture is added 3 to 10 weight percent, preferably about 5 weight percent lead azide. Firing of the initiator composition may be standard electrical means including any desired safety devices in the circuitry, such as spark gaps and/or ferrite resistors to prevent unwanted initiation from strong radio frequency or high voltage sources, at the option of the designer of the system.

While the gas generant compositions of this invention may be employed as the charge in conventional gas generators of the prior art, they are most advantageously employed in the particular gas generator construction described in the copending application of Gary Adams and Fred Schneiter bearing U.S. application Ser. No. 088,992, filed Oct. 29, 1979 and issued as U.S. Pat. No. 4,296,084 on Oct. 20, 1981.

This gas generator, which has a concentric configuration with the initiator at the center of a suitable reaction chamber surrounded by the gas generant compositions in suitable pelletized form which is in turn surrounded by wire screen, specially selected woven fiber glass cloth, and a second layer of wire screen covering radially arranged exit ports to a concentric diffusion chamber, the radially arranged exit ports of which are filtered by wire screen supporting an aluminum silicate fiber mat as a secondary filter, enables the advantageous characteristics of the inventive embodiments to be fully utilized.

Specifically, the pyrotechnic material of the initiator, the gas generant composition and the primary filter are all contained in a hermetically sealed aluminum cartridge. This insures reliability of the generator over long periods. The aluminum cartridge is positioned in the combustion chamber of the generator. Upon initiation of combustion by the firing of the squib, the rising gas pressure ruptures the side wall areas of the cartridge adjacent the orifices of the combustion chamber. This allows gas to flow through the primary filter and out of the combustion chamber through the several orifices. The combustion chamber filter consists of one to three layers of a coarse screen adjacent to the wall of the chamber. This serves as a collecting area for gas to flow along the chamber wall to the chamber orifices and permits gas to flow evenly through the primary filter regardless of the proximity of a combustion chamber orifice. Inboard of the coarse screen are one or more layers of fiberglass woven fabric. The fiberglass fabric is selected for compatibility with the temperature in the combustion chamber during burning of the selected gas generant composition thereby to provide a tacky surface for particle entrapment that does not melt or erode away under the effects of the high temperature gas. An effect accompanying the production of the tacky surface appears to be a swelling of the fibers of the fiberglass fabric that reduces the porosity of the primary filter. It is believed that this swelling causes the primary filter to restrict the flow of gas and combustion residue out of the combustion chamber. This effect is believed to continue for only a short interval, up to about 3 milliseconds, but long enough to allow cooling and condensation of hot and molten particulate residue within the voids of the filter. Inside the multiple layers of the fiberglass cloth are multiple layers of fine mesh carbon steel screen. The layers of the fine mesh carbon steel provide a large relatively cool surface for condensation of combustion solids prior to encountering the multiple layers of fiberglass woven fabric. Approximately 95 percent of all solid products of combustion are trapped in the combustion chamber filter. It is noted that outside of the combustion chamber, the velocity of the gases that are generated becomes so high that trapping of the products of combustion in that region becomes exceedingly difficult.

The secondary filter is comprised of multiple wraps of wire mesh which serves to cool the gas and provide surface for condensation of solid particles. Surrounding the wire mesh filter pack are one or more wraps of the aluminum silicate blanket.

Surrounding the aluminum silicate blanket are several wraps of fine mesh screen which provide structural support for the aluminum silicate blanket. It is noted that aluminum silicate blanket is porous, has very little strength, and tends to disintegrate under the effects of the high velocity gas stream. The filter elements, however, retain the solids entrapped. The fine mesh outer screen is used to trap these aluminum silicate filter particles and prevent them from being carried out of the exit orifices of the housing with the clean combustion gases. One skilled in the art will recognize that the successful initiation of combustion of any gas generant requires the use of an adequate quantity of initiator to insure that sufficient hot combustion products of the initiator contact enough of the exposed generant surface to kindle a self sustaining flame front. The selection of such amounts by a number of simple graduated experiments for any initiator-gas generant combination is well within the skill of a journeyman in the art. In the case of the compositions of the instant invention from 0.02 g to 0.03 g, preferably from 0.024 g to 0.026 g of the boron, potassium nitrate, lead azide initiator described herein per gram of gas generant composition may be employed.

One skilled in the art will also recognize that although the combustion temperature of the instant compositions is significantly lower than those of the prior art, in order to reduce the gas temperature in the crash bag to a level tolerable by the vehicle occupants, additional cooling means must be provided. In addition to the cooling method of the aforementioned Schneiter and Adams copending application, the standard cooling means, normally layers of woven metal mesh which additionally may serve as conventional filtration means may be employed. One skilled in the art will also recognize that the effluent gases from combustion of the instant composition may contain sufficient alkaline material to cause burns or discomfort to someone coming in contact therewith. In addition to the fiberglass of the aforementioned Schneiter and Adams application, the conventional neutralizers of the prior art, conveniently carbonate salts, may be employed to adjust the pH of the effluent gases from combustion of the compositions of this invention to levels tolerable by humans, conveniently pH levels below 10.0.

The following examples further illustrate the best mode contemplated for the practice of the present invention.

The compositions shown in the following two tables were pressed into pellets and burned in a gas generator motor that was vented into an evacuated steel tank to collect the combustion gases for analysis. These compositions have the advantage of producing nitrogen with very low concentrations of $CO_2$, CO and water which allows its use for inflation of crash bags and other purposes requiring an inert atmosphere.

| NITRATE OXIDIZED COMPOSITIONS | | | | | |
|---|---|---|---|---|---|
| | 31-1 | 3-2 | 31-3 | 31-4 | 14-1 |
| Sample No. | | | | | |
| $K_2BT$ | 54.1 | 51.4 | 49.1 | 44.9 | 52.5 |
| $KNO_3$ | 45.9 | 48.6 | 50.9 | 55.1 | — |
| $NaNO_3$ | — | — | — | — | 47.5 |
| Generator P (psi) | 2300 | 2100 | 2270 | 2400 | 910 |
| Action Time (ms) | 78 | 90 | 80 | 79 | 153 |
| Gas Analysis | | | | | |
| CO, ppm | 1000 | 700 | 800 | 196 | 371 |
| $CO_2$, % | 5 | 2 | <1 | <1 | — |

| NITRITE OXIDIZED COMPOSITIONS | | | | |
|---|---|---|---|---|
| | 31-6 | 29-1 | 29-6 | 11-4 |
| Sample No. | | | | |
| $Na_2BT$ | — | — | — | 30.5 |
| $K_2BT$ | 49.5 | 48.5 | 43.7 | — |
| $NaNO_2$ | 50.5 | 51.5 | 56.3 | 69.5 |
| Generator P (psi) | 2530 | 2520 | 2120 | 2200 |
| Action Time (ms) | 81 | 74 | 75 | 36 |
| Gas Analysis | | | | |
| CO, ppm | 80 | 670 | 476 | 935 |
| $CO_2$, % | <1 | <1 | <1 | 1.3 |
| $NO_2$, ppm | <1 | 1 | 50 | 0 |

Another class of gas generant compositions, producing a dry or substantially moisture-free atmosphere, can be prepared from the tetrazole-containing compounds such as the metal salts of bitetrazole or azobitetrazole. These compositions can result in the generation of moderate amounts of $CO_2$. The application would be with conditions less affected by the $CO_2$, such as, fully enclosed or sealed air bag as used in inflatable escape chutes, life rafts, etc. Cooler burning compositions result from the use of the alkaline earth salts as part of the tetrazoles and oxidizer which form less stable carbonates that liberate $CO_2$. For example, the calcium salt of bitetrazole oxidized with calcium nitrate would form one or two moles of $CO_2$, depending upon combustion rates and conditions, along with the nitrogen, essentially following the equation:

$$CaC_2N_8 + Ca(NO_3)_2 \rightarrow xCaO + xCO_2 + (2-x)CaCO_3 + 5N_2$$

The temperature and combustion conditions control the extent of the formation of $CaCO_3$ or $CO_2$ and CaO. The result is a moisture free gaseous product containing $CO_2$ suitable for uses where moisture would cause corrosion or other problems. The type of tetrazole salt used would be dictated by the specific reactants and amount of $CO_2$ allowable in the gas product. For example, the extent of decomposition of the metal carbonate to the oxide and $CO_2$ depends upon the type of carbonate that would be formed. The potassium and sodium carbonates in the combustion zone are the most stable and least likely to decompose to the oxide while magnesium carbonate decomposes readily at approximately 600°–700° C., forming $CO_2$ and magnesium oxide.

Subject matter disclosed but not claimed in this application is disclosed and is being claimed in the copending application, filed concurrently herewith of Norman H. Lunstrum and Graham C. Shaw bearing Ser. No. 221,943.

I claim:

1. A solid pellet for generating non-toxic, substantially moisture-free nitrogen gas consisting essentially of a metal salt of a non-hydrogen containing tetrazole compound selected from the group consisting of alkali metal salts, alkaline earth metal salts and admixtures thereof and an oxidizer containing nitrogen and a member selected from the group consisting of alkali metal nitrates, alkali metal nitrites, and admixtures thereof.

2. The pellet of claim 1 wherein said tetrazole is azobitetrazole.

3. The pellet of claim 1 wherein said oxidizer is an alkali metal nitrate.

4. The pellet of claim 3 wherein said oxidizer is an alkali nitrite.

5. The pellet of claim 3 wherein said oxidizer is sodium nitrate.

6. The pellet of claim 4 wherein said oxidizer is sodium nitrate.

7. The pellet of claim 3 wherein said oxidizer is potassium nitrate.

8. The pellet of claim 1 wherein said tetrazole compound is present in an amount from about 35 to about 60 weight percent and said oxidizer is present in an amount from 40 to about 65 weight percent.

9. In a method for inflating air bag comprising igniting a pellet of pyrotechnic material to generate a gas, filtering and cooling the generated gas, and using the filtered and cooled gas to inflate the air bag, the improvement comprising, the step of using a solid pellet for generating non-toxic, substantially moisture-free, nitrogen gas consisting essentially of a metal salt of a non-hydrogen containing tetrazole compound selected from the group consisting of alkali metal salts, alkaline earth metal salts and admixtures thereof and an oxidizer containing nitrogen and a member selected from the group consisting of alkali metal nitrates, alkali metal nitrites, and admixtures thereof.

10. A method for the generation of a substantially moisture-free, non-toxic nitrogen gas which comprises:
   a. compounding a gas generant composition consisting essentially of a non-hydrogen containing metal salt of a tetrazole compound selected from the group consisting of alkali metal salts, alkaline earth metal salts and admixtures thereof and an oxidizer containing nitrogen and a member selected from the group consisting of alkali metal nitrates, alkali metal nitrites, and admixtures thereof;
   b. pelletizing said composition;
   c. igniting said pelletized composition to produce a substantially moisture-free, non-toxic nitrogen gas.

11. The method of claim 10 whereby said non-toxic nitrogen gas contains carbon monoxide in non-toxic amounts.

12. The method of claim 10 whereby said non-toxic nitrogen gas contains carbon monoxide in amounts less than about 1000 ppm.

13. The method of claim 10 whereby said tetrazole compound is present in an amount from about 35 to about 60 weight percent and said oxidizer is present in an amount from about 40 to 65 weight percent.

* * * * *